March 8, 1966        L. PÉRAS        3,239,038

CONTROL DEVICE FOR TRANSMISSION AND ELECTRIC CLUTCH

Filed Feb. 3, 1964        2 Sheets-Sheet 1

Inventor
Lucien Peras
By Stevens, Davis, Miller + Mosher
Attorneys

United States Patent Office 3,239,038
Patented Mar. 8, 1966

1

3,239,038
CONTROL DEVICE FOR TRANSMISSION AND ELECTRIC CLUTCH
Lucien Péras, Billancourt, France, assignor to Regie Nationale des Usines Renault, Billancourt, France
Filed Feb. 3, 1964, Ser. No. 341,930
Claims priority, application France, Feb. 6, 1963, 923,948
3 Claims. (Cl. 192—3.5)

In automatic transmission mechanisms of vehicles which provide several mechanical gear ratios, it is advantageous to cause the progressiveness of clutch engagement to vary as a function of the specific gear engaged. More particularly, the return to the ratio providing the greater gear reduction and involving therefore considerable torques and accelerations should take place very gradually. On the other hand, changing to a ratio giving a lesser gear reduction requires a more rapid clutch engagement to preserve smooth driving characteristics in conjunction with less strain on the clutch unit. This result can be achieved by using electromagnetic clutches and notably magnetic power clutches.

The gear change discriminator constituting the subject-matter of this invention, utilizes a relay having two coils wound in the same direction which receives control information from a governor; this governor has stepped electric contacts for controlling the automatic gear changes of the transmission mechanism and transmitting this information, after discriminating the same, to an electronic device for energizing the clutch winding.

Another relay associated with the first relay permits feeding this discrimination while performing the functions necessary for starting the vehicle.

The governor may be of conventional type, and for example of the eddy current type, and the control information may be applied thereto as a function of the vehicle speed and of the position of the accelerator.

The electronic device for energizing the clutch coil may also be of conventional type and notably of the character described and illustrated in the patent application No. 253,900, filed by the same applicant on January 25, 1963, and now Patent No. 3,203,518, wherein the reengagement of the electromagnetic clutch is governed by a current law subordinate to the engine speed and also to time, this law being adapted to be modified by varying a damping resistance.

Figure 1:
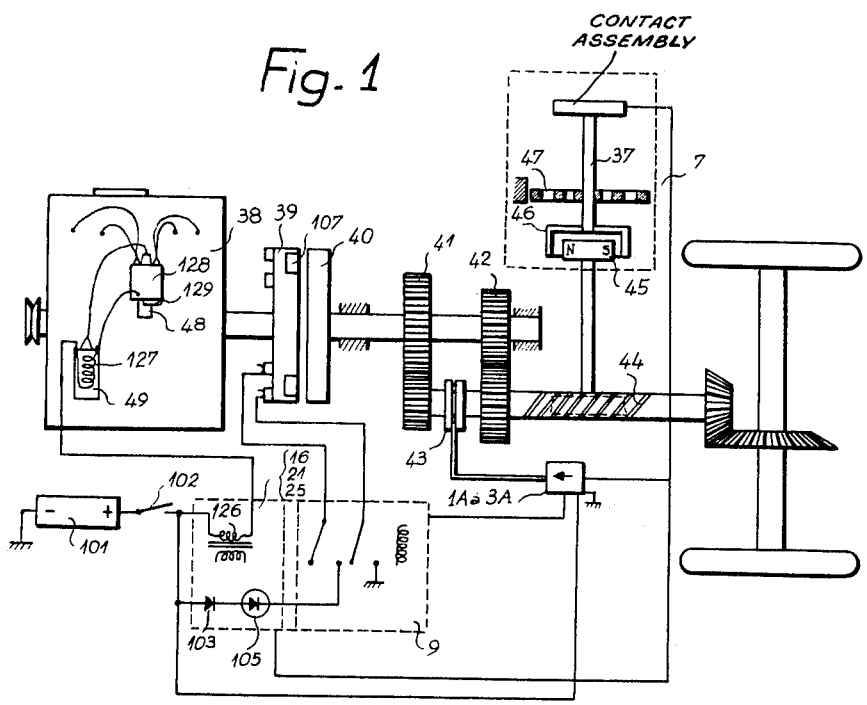
Figure 2:
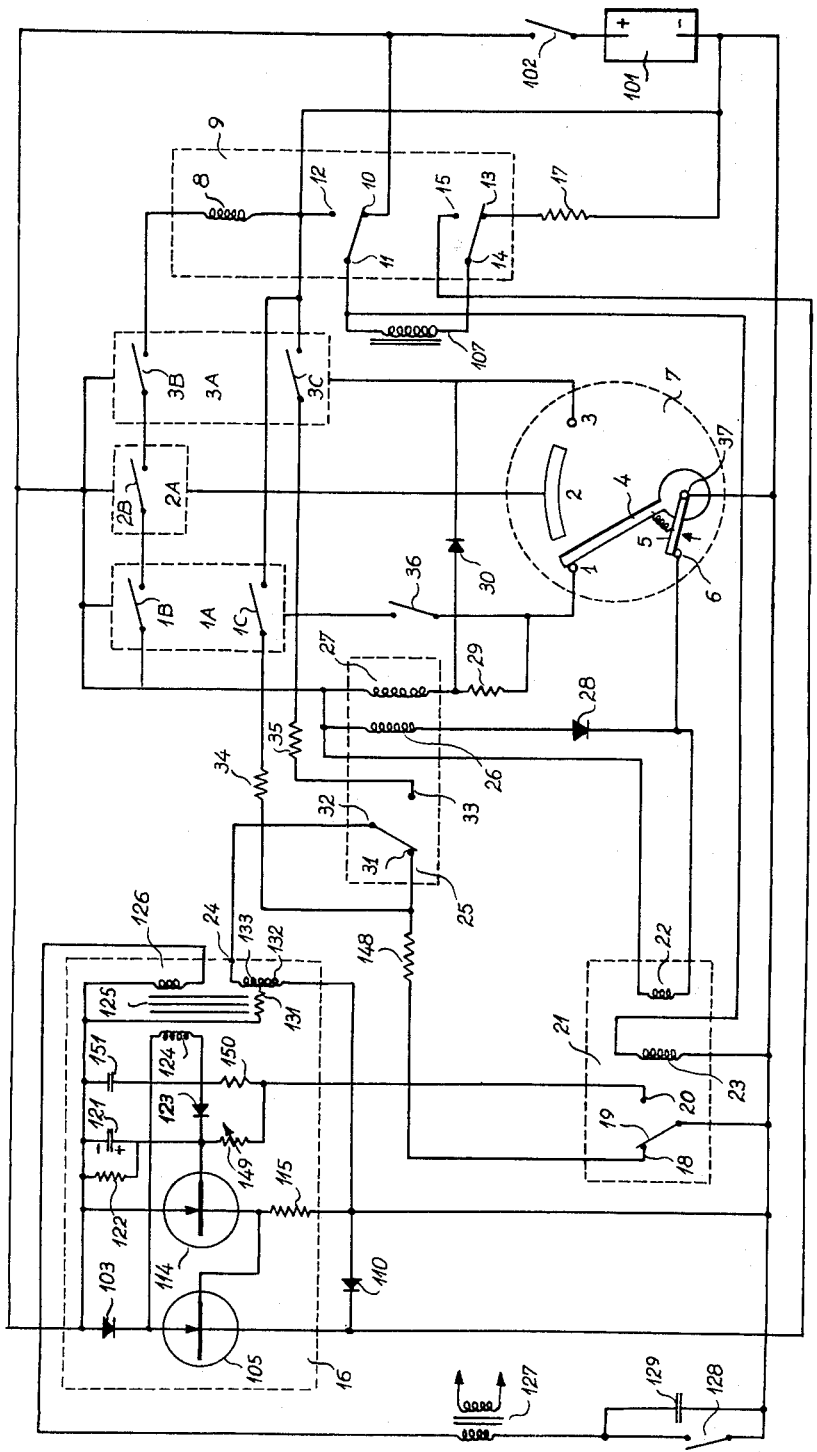

In order to afford a clearer understanding of this invention and of the manner in which the same may be carried out in practice, reference will now be made to the accompanying drawings, in which:

FIGURE 1 is a diagrammatic illustration of the essential components elements of an automotive vehicle and of the device of this invention, and FIGURE 2 is a basic wiring diagram illustrating a typical form of embodiment of this invention which is given by way of example, the device being associated with a transmission mechanism providing three forward speeds controlled by servo means and comprising a single electromagnetic starting clutch, that is, a clutch used only for starting the vehicle from rest, which is disconnected during gear changes. This electromagnetic clutch is energized under the conditions set forth in the aforesaid patent application.

As a rule, in its application to an automotive vehicle comprising an engine, a clutch and a transmission mechanism providing several gear ratios, this invention has for its purpose the controlling of the clutch by means of an electromagnetic coil at the proper times as consistent with speed changes controlled from a governor device, in such a way that the clutch re-engagement takes place

2 according to a law of progressiveness which varies as a function of the specific ratio engaged at that time. Thus, more particularly, the progress of re-engagement is slower when the engaged speed provides a lower gear ratio than the previous speed, and is faster for the opposite gear change direction.

FIGURE 1 illustrates very diagrammatically the application of this invention to a vehicle comprising an engine 38, a disc clutch 39, 40 operated by means of a winding 107, and a transmission mechanism of which only one pair of gears 41, 42 is shown.

A governor 7 of known type responsive to the vehicle speed acts on the one hand upon the transmission to control the automatic gear changes, and on the other hand upon an electric supply or energizing device 16 comprising two relays: a controlled relay and a discriminator 25, this device 16 being adapted to energize the clutch winding 107 with current of which the magnitude varies according to the gear ratio just engaged and also according to whether the new gear ratio is higher or lower than the preceding one, or, in other words, according to the up or down gear change direction.

Considering the assembly more in detail, the engine 38 is equipped with an ignition distributor 48 incorporating a condenser 129 and a contact breaker 128 connected to the primary 127 of an ignition coil 49; the circuit leading back to the ignition key switch 102 through the primary 126 of the electronic feed transformer 16 comprising a pair of relays 21, 25 not shown in order not to complicate the drawing. The engine crankshaft is coupled to the driving plate 39 of the clutch containing the winding 107. The driven plate 40 of the clutch is coupled to pairs of pinions 41, 42 transmitting in the engaged position of the clutch the torque to the propeller shaft 44; the transmission ratio being selected by means of the selector sliding fork 43 controlled by a suitable mechanism 1A to 3A. Only one fork is shown in the figure to simplify the drawing. The shaft 44 connected to the wheels of the vehicle carries a gearing for rotatably driving a magnet 45 tending to rotate due to the reaction produced by the eddy current a monitoring bell-shaped member 46 connected to a return spiral spring. The bell 46 is connected through shaft 37 to the electrical contact assembly which includes contacts 1 to 6 inclusive, the assembly constituting the governor 7 transmitting control information as a function of the velocity of rotation to the mechanism 1A to 3A and to relays 21 and 25, as will be described below.

The clutch coil 107 is fed with energizing current from the storage battery 101 of the vehicle through the ignition key switch 102, a diode 103, a transistor 105, the front contacts of relay 9, the return circuit from the clutch winding being through the ground to the storage battery 101.

The invention will now be described with reference to FIGURE 2.

The governor 7 of known type controlling the gear changes in the transmission mechanism comprises a first movable contact arm 5 connected to a pivot pin 37 and contacting a fixed contact stud 6 when the vehicle is at rest or driven at low speeds, a second, longer contact arm 4 resiliently connected to said first contact arm 5 is provided and engages another contact stud 1 at low vehicle speeds, an opposite contact stud 3 at high speeds, and a contact sector 2 at intermediate speeds. These contacts 1, 2 and 3 are disposed in this order and control the known mechanisms 1A, 2A and 3A respectively for engaging the corresponding gear ratios of the transmission mechanism when the vehicle speed increases. The mechanisms 1A, 2A, 3A (shown schematically in FIG. 2), respectively, include contacts 1B, 2B and 3B actioned by the governor by contacts 1, 2, 3 the contacts controlling the electromagnets or electric motors that move sliding forks 43 (FIG. 1) in a selected direction to disengage a speed contact or establish a new contact. To this end, these mechanisms are connected to the storage battery 101 of the vehicle through the ignition key switch 102 and the contacts of governor 7. The control circuit of the first-speed or low-gear mechanism 1A may be disconnected manually by means of a suitable hand switch 36 for changing to neutral. These mechanisms 1A to 3A may consist, for example, of conventional electromagnets or of relay-controlled electromotor.

During the gear change time period, i.e. the time elapsing from the disengagement of one dog coupling to the engagement of the other, selected dog coupling, the relevant contact 1B or 2B or 3B is open, thus opening the circuit of coil 8 of a relay 9 which is connected to the storage battery 101 through the ignition key switch 102 and said contacts 1B, 2B and 3B connected in series. This relay 9 has two movable contacts 11, 14 engaging respectively in the deenergized condition of the relay corresponding contacts 10, 13 and in the energized condition of relay 9 another pair of contacts 12 and 15, respectively. The clutch winding 107 is connected directly through brushes (not shown) to the aforesaid contact arms 11, 14. Contact 15 is connected to the collector of the power transistor PNP 105 pertaining to the electronic feed circuit 16, and contact 13 is connected to the negative terminal of the battery through a resistance 17.

This known electronic feed system 16 described and illustrated in the aforesaid preceding patent application receives the information concerning the speed of the vehicle engine through a transformer 125 having a low-resistance winding 126 connected in series with the primary 127 of the ignition coil and the contact breaker 128 to which condenser 129 is connected in parallel. Another winding 124 charges the condenser 121 through the pair of diodes 103 and 123. The direction of the transformer windings and of the diodes is such that each time the contact breaker 128 is open the condenser 121 is charged during a substantially constant time period on the condenser side connected to the base electrode of the PNP-type transistor 114 which is thus blocked at the occurrence of each charging wave. Between successive charging waves this condenser 121 is discharged through the variable resistance 149 having its opposite end connected to the negative terminal of the storage battery through the front contact 20 and movable contact arm 19 of a control relay 21 having two windings 22 and 23. This front contact 20 is also connected to the ignition key switch 102 through a large-capacity tank condenser 151 and a protection resistance 150. When control relay 21 becomes de-energized so as to disconnect 19 from 20, condenser 121 is again discharged but at a slower rate through the resistance 122 connected across the terminals of condenser 121, the other condenser 151 causing on the other hand the contacts 19, 20 to open by restoring gradually current flow in the clutch winding. Assuming that contacts 19, 20 are closed, each charging wave blocking the transistor 114 permits of biasing the base electrode of transistor 105 through the resistance 115 connected on the one hand to the collector electrode of 114 and to the base electrode of 115, and on the other hand to the negative terminal of the battery. Transistor 105 will thus become conductive and the power circuit is through the ignition key switch 102, diode 103, transistor 105 and clutch winding 107, provided that relay 9 is energized, or, otherwise stated, that contacts 11 and 12, 14 and 15 are closed, a current pulse flowing through the clutch winding. When condenser 121 is discharged, that is, between successive charging waves, resistance 149 biases transistor 114 which becomes conductive and reduces its collector-electrode potential to a value below that required for biasing the base electrode of transistor 105, so that the current flow is discontinued therein.

The diode 110 connected between the collector electrode of transistor 105 and the negative terminal of the storage battery protects this transistor against overvoltages deterimental to its useful life. Under these conditions, the current flowing through the clutch winding 107 is a square wave and a ratio of the conducting time to the non-conducting time increases with the ignition frequency since the charging waves have a substantially constant time, until a 100% conducting time is attained when contacts 19, 20 are closed.

When these contacts 19, 20 are open, the current flowing through the clutch winding 107 assumes values increasing as a function of the time elapsed and of the engine speed up to the maximum value, this value being finally attained irrespective of the actual engine speed. In fact, the charging waves applied to condenser 121 charge the other condenser 151 in the opposite direction through the resistance 149 which becomes inoperative.

The transformer 125 has two other auxiliary damping windings 132 and 133 interconnected in series and receiving direct current through a resistance 131. The free or outer end of winding 132 is connected to the negative terminal and the corresponding end of winding 133 is connected to point 24. Connecting a damping resistance 148 between this point 24 and the negative terminal will take one fraction of the energy of the charging waves of condenser 121, thus reducing their duration and amplitude and reducing likewise, given an equal frequency of the ignition breaker points 128, the current in winding 107, since the conducting time ratio decreases. The change thus produced in the resistance value causes the clutch engagement to take place more or less smoothly.

The damping resistances are inserted into the circuit through the contact set of relays 21 and 25 of which the connections constitute the essential feature of the present invention.

The coil 23 of control relay 21 is connected on the one hand to the negative terminal of the storage battery 101 and on the other hand to the movable contact arm of relay 9, and coil 22 of the same relay 21 is connected at one end to one side of the ignition key switch 102 and at the other end to contact stud 6 closed at low engine speed.

Relay 25 also comprises two coils 26 and 27 wound in the same direction and having a common terminal connected to the ignition key switch 102. The other end of coil 26 is connected to contact stud 6 through a separating diode 28 and the other end of coil 27 is connected to contact stud 1 through a resistance 29 and also to contact stud 3 through another separating diode 30. The value of resistance 29 is such that winding 27 can hold relay 25 in its operative position but cannot attract its movable member when only contact 1 is closed. In the inoperative condition the contact arm 32 of relay 25 engages contact 31 and in the operative position it engages the other contact 33. This contact arm 32 is connected to the winding 133 through connecting point 24, and the back contact 31 is connected through resistance 148 to the back contact 18 of relay 21 of which the movable contact arm 19 is connected through the return line to the negative terminal of the battery.

From the back contact 31 of relay 25 a wire leads to resistance 34 and subsequently to a contact 1C closed when the lowest gear, i.e., the one providing the highest ratio, controlled through mechanism 1A, is engaged or when the control information therefor is delivered, the return from contact 1C being to the negative terminal of the storage battery 101. The front contact 33 of relay 25 is connected to a resistance 35 connected to contact 3C closed when the third gear, i.e., the one providing the lowest transmission ratio, is engaged or when the control information therefor is issued, the return from contact 3C leading similarly to the negative terminal of battery 101.

The operation of the assembly may now be briefly described since the operation of the electronic feed unit 16 up to connecting point 24 has been described hereinabove.

Assuming that the vehicle speed is zero and that the engine is idling, after closing the hand switch 36 to engage the first or low gear controlled through 1A since contacts 1, 4 are closed, contacts 5, 6 are closed in turn and the pair of relays 21, 25 are energized through coil 22 in the case of relay 21 and coils 26 and 27 in the case of relay 25. However, only a low-value, so-called holding current flows through coil 27.

Contacts 19, 20 being closed, the current law obtaining in the clutch winding 107 will be subordinate to the engine speed. Since no resistance is fed through point 24 (as relay 25 is energized and contact 3C open) a rather fast progressiveness is obtained for starting the vehicle from rest, this occurring immediately as the driver depresses the accelerator pedal to increase the engine speed and therefore the amount of current flowing through the clutch winding.

When the vehicle speed has risen to a value either approximating or overstepping the 100% conduction time of transistor 105, the contact arm 5 moves away from contact stud 6, thus de-energizing coil 22 and causing relay 21 to resume its inoperative condition; thus, contacts 19, 20 are open and contacts 18, 19 are closed. The action of tank condenser 151 will gradually restore the current flowing through the clutch winding 107 to its maximum value (unless this value is already attained) as a function of the time elapsed since the opening of contacts 18, 19. Relay 25 remains in its energized condition through its coil 27. Thus, connecting point 24 remain in its open-circuit condition and when contacts 5, 6 open, no momentary current drop is produced by the resistance 148, as would occur if point 24 were connected directly to contact 18 without passing through contacts 31, 32.

As the vehicle speed increases, contact arm 4 is moved away from contact stud 1 to engage contact stud 2, thus causing:

(1) Relay 9 to be de-energized through contact 2B, by allowing a low reverse de-magnetizing current (in lieu of the current from transistor 105) to flow through the clutch winding 107;

(2) the re-energization of relay 21 through coil 23 fed from contact 10 connected to the ignition key switch 102, thus recharging or "resetting" condenser 151;

(3) de-energizing relay 25;

(4) engaging the second gear under the control of mechanism 2A closing contact 2B;

(5) re-energizing relay 9 to normally restore the clutch winding energization, and (6) De-energizing relay 21 since the movable contact arm 11 is again connected to the negative terminal through contact 12.

Contacts 31, 32 and 18, 19 being closed, connecting point 24 is connected to the negative terminal of storage battery through resistance 148, thus imparting to the current flowing through the clutch winding 107 a value proportional to the vehicle speed and time, the engine speed law being smoother than under starting conditions. The coupling or clutch engagement takes place without any shock.

As the speed increases, contact arm 4 moves away from contact stud 2 and engages contact stud 3, and the above-described sequence of operations takes place again, except that as relay 25 is energized through its winding 27 fed through the diode 30, at the end of the process the above-defined smoothing law is controlled by resistance 35 of higher value than resistance 148, contacts 31–33 and 3C being closed. The response to the engine speed will be faster than in the case of a gear change for engaging the intermediate ratio.

If desired, resistance 35 and contact 3C may be dispensed with by resorting to the starting law. Each time a gear change occurs, whatever it may be, relay 21 is energized and "resets" condenser 151.

Should the vehicle speed decrease, contact arm 4 re-engages contact stud 2, thus causing the change to intermediate gear and the de-energization of relay 25, whereby resistance 148 is re-inserted in the circuit.

If the vehicle speed is further reduced, contact arm 4 abuts against contact stud 1 and the first or low gear is re-engaged, but since contact 5, 6 is not yet reclosed, the relay coil 27 which is energized through resistance 29, cannot actuate relay 25. Relay 25 will thus remain inoperative and at the end of the sequence of operations leading to the engagement of the lowest gear resistances 148 (through contacts 18, 19) and 34 (through contact 1C) are connected in parallel between the connecting point 24 and the negative terminal of the storage battery. Therefore, when the clutch is re-engaged the current law responsive to engine speed and to time will be still smoother, and the clutch engagement will be more gradual.

At a still lower vehicle speed contacts 5, 6 close and the conditions prevailing when starting the vehicle from rest are restored, relay 21 being energized.

The combination of relays 21 and 25 is conjunction with the stepped-contact governor 7 will thus permit of discriminating the various gear changes and notably the engagement to and from first or low gear. This arrangement further avoids a temporary current drop when opening the low-speed contacts 5, 6.

Resistances 34, 35 and 148 may be replaced with complex impedances such as resistances, condensers, induction coils, diode or transistor junctions, etc., with a view to provide the desired current law.

To facilitate gear changes and impart a greater smoothness thereto, relay 25 may carry auxiliary contacts acting for example through an electromagnet upon the carburetor throttle for automatically accelerating the engine when changing to a lower gear.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. An apparatus for discriminating gear changes in an automatic transmission system for a vehicle and the like having a motor, an electrically operated clutch mechanically connected to said motor, a mechanical gearbox having a number of gears connected to and driven by said clutch, and electric means connected to said gearbox for changing the gear ratio of said gearbox, the apparatus comprising a source of electrical current, a governor for controlling the gear changes of said gearbox as a function of the vehicle speed, said governor having a step contact corresponding to each gear ratio of said gearbox connected to and adapted to feed an energizing signal to said electric means for controlling the gear changes therein, one of said step contacts adapted to effect the highest gear ratio, and another of said step contacts adapted to effect the lowest gear ratio, said governor further comprising a contact stud, a monitor mechanically connected between the output of said gearbox and said governor for enabling said governor to sense the speed of the vehicle, a governor contact arm electrically connected to said source and mechanically connected and controlled by said monitor for sequentially contacting each of said step contacts, another contact arm electrically connected to said source for electrically connecting said contact stud to said current source after said governor contact arm re-engages said one contact in response to a decrease in vehicle speed, a clutch coil disposed on said clutch, a discriminating relay having a relay contact arm and a first and second coil, said first coil being capable of switching and holding the relay contact arm and said second coil being capable of only holding said relay contact arm, said first coil being electrically connected to said contact stud and said second coil being connected to said one step contact, said discriminating relay having first and second relay contacts whereby said relay contact arm contacts said first relay contact when said discriminating relay is de-energized, a clutch coil energizing circuit having an input terminal, an output terminal, said output terminal being connected to said clutch coil, said source being connected to said input terminal, said energizing circuit further comprising a damping coil means for controlling the output current of said energizing circuit, said damping coil means having a mid-terminal connected to said input terminal, a first end terminal connected to said output terminal and a second end terminal connected to said discriminating relay contact arm, a control relay connected to said source and having its actuating coil connected to said contact stud so that it is actuated when said another contact arm re-engages said contact stud, a first resistance circuit connected between said first discriminating relay contact and said control relay, a second resistance circuit connected between said second discriminator relay contact and said clutch coil, the value of said first resistance circuit being different from the value of said second resistance circuit, whereby the rate of change of current magnitude in said clutch coil is controlled by said discriminating relay which is in turn controlled by said governor.

2. An apparatus as set forth in claim 1, wherein said control relay has a first contact, a resistor connected between said control relay first contact and said discriminator relay first contact, said control relay having a second contact connected to said energizing circuit for energizing the same, and a control contact arm normally engaging said control relay first contact and electrically connected to said source, whereby said resistor is placed in parallel with said damping coil means when said control relay is de-energized and said energizing circuit is energized when said control relay is energized.

3. An apparatus as set forth in claim 1, further comprising relay means connected to said clutch coil for alternately connecting said clutch coil to said discriminating relay and said current source.

References Cited by the Examiner
UNITED STATES PATENTS

| | | | |
|---|---|---|---|
| 1,191,290 | 7/1916 | Dillon et al. | 192—.033 X |
| 2,077,194 | 4/1937 | Winter | 192—3.5 X |
| 2,302,005 | 11/1942 | Caves | 192—3.5 X |
| 2,539,649 | 1/1951 | Wintler | 192—.076 |
| 2,646,864 | 7/1953 | Miller et al. | 192—3.5 |
| 3,073,422 | 1/1963 | Baumann | 192—3.5 |

DAVID J. WILLIAMOWSKY, *Primary Examiner.*

BENJAMIN W. WYCHE III, *Assistant Examiner.*